United States Patent
Leonhartsberger et al.

[11] Patent Number: 5,345,766
[45] Date of Patent: Sep. 13, 1994

[54] ARRANGEMENT FOR CARRYING OUT A TWO-STAGE LINEAR MOVEMENT

[75] Inventors: Heinz Leonhartsberger, Schwertberg; Stefan Eppich, Arbing; Werner Kappelmüller, Schwertberg, all of Austria

[73] Assignee: Engel Maschinenbau Gesellschaft m.b.H., Schwertberg, Austria

[21] Appl. No.: 90,067

[22] PCT Filed: Jan. 13, 1992

[86] PCT No.: PCT/AT92/00003
§ 371 Date: Jul. 12, 1993
§ 102(e) Date: Jul. 12, 1993

[87] PCT Pub. No.: WO92/11993
PCT Pub. Date: Jul. 23, 1992

[30] Foreign Application Priority Data

Jan. 14, 1991 [AT] Austria .................. 53/91
Nov. 14, 1991 [AT] Austria .................. 2257/91

[51] Int. Cl.⁵ .................................... F15B 7/00
[52] U.S. Cl. .................................... 60/545; 60/565
[58] Field of Search .................. 60/545, 574, 565; 91/361, 362

[56] References Cited

U.S. PATENT DOCUMENTS

| | | | |
|---|---|---|---|
| 3,359,728 | 12/1967 | Torossian | 60/545 |
| 4,607,998 | 8/1986 | Hawkes | 60/545 |
| 4,790,234 | 12/1988 | Hampejs et al. | 91/362 |
| 4,932,311 | 6/1990 | Mibu et al. | 91/361 |
| 4,961,372 | 10/1990 | Hartsberger | |

FOREIGN PATENT DOCUMENTS

3721333 1/1989 Fed. Rep. of Germany .

OTHER PUBLICATIONS

International Search Report PCT/AT 92/00003.

*Primary Examiner*—Thomas E. Denion
*Attorney, Agent, or Firm*—Notaro & Michalos

[57] ABSTRACT

An arrangement for carrying out a two-stage linear movement with a stationary and a movable constructional unit, comprises a hydraulic cylinder and an hydraulic piston preferably in the form of a plunger. The hydraulic piston has a hollow volume which houses a plunger piston which, in turn, rests on a spindle rotated by a servomotor in the movable construct-ional unit. The plunger piston can be displaced axially in the hydraulic piston and also in the hydraulic cylinder by use of the spindle.

15 Claims, 10 Drawing Sheets

FIG. 12 ial unit with an hydraulic cylinder with at least one filling valve and an hydraulic piston, preferably implemented as plunger, having a hollow volume and with a device for building up pressure in the hydraulic cylinder.

ARRANGEMENT FOR CARRYING OUT A TWO-STAGE LINEAR MOVEMENT

FIELD AND BACKGROUND OF THE INVENTION

The invention relates to an arrangement for carrying out a two-stage linear movement comprising a stationary and a movable constructional unit with an hydraulic cylinder with at least one filling valve and an hydraulic piston, preferably implemented as plunger, having a hollow volume and with a device for building up pressure in the hydraulic cylinder.

With various and diverse machinery it is required that machine parts carry out linear movements. Examples are machine tools, injection moulding machines and robots.

While in some machines it is of primary importance that the movement is carried out rapidly (for example in robots), other machines require primarily large forces.

In the case of injection moulding machines, for example in die clamping devices, the requirements change while the movement is in progress. During closure of the form tool, for example, the movable form half first needs to be moved as rapidly as possible in accordance with a given speed profile, wherein during this movement relatively little force needs to be expended whereupon during the continued movement a large pressure is necessary.

It is generally known that by means of mechanical devices, for example by means of helical drives, and here in particular by means of ball screws fast linear movements can be carried out. On the other hand, high pressure, in particular with hydraulic devices such as with hydraulic piston cylinder units, is achieved.

SUMMARY OF THE INVENTION

It is the task of the invention to create an improved combined mechanical hydraulic arrangement capable of working in a multistage fashion and with which alternatingly fast movements as well as also high pressures can be achieved.

BRIEF DESCRIPTION OF THE DRAWINGS

In the following, various embodiments of the invention will be described in conjunction with the figures of the drawings.

DESCRIPTION OF THE PREFERRED EMBODIMENT

Figure 1:
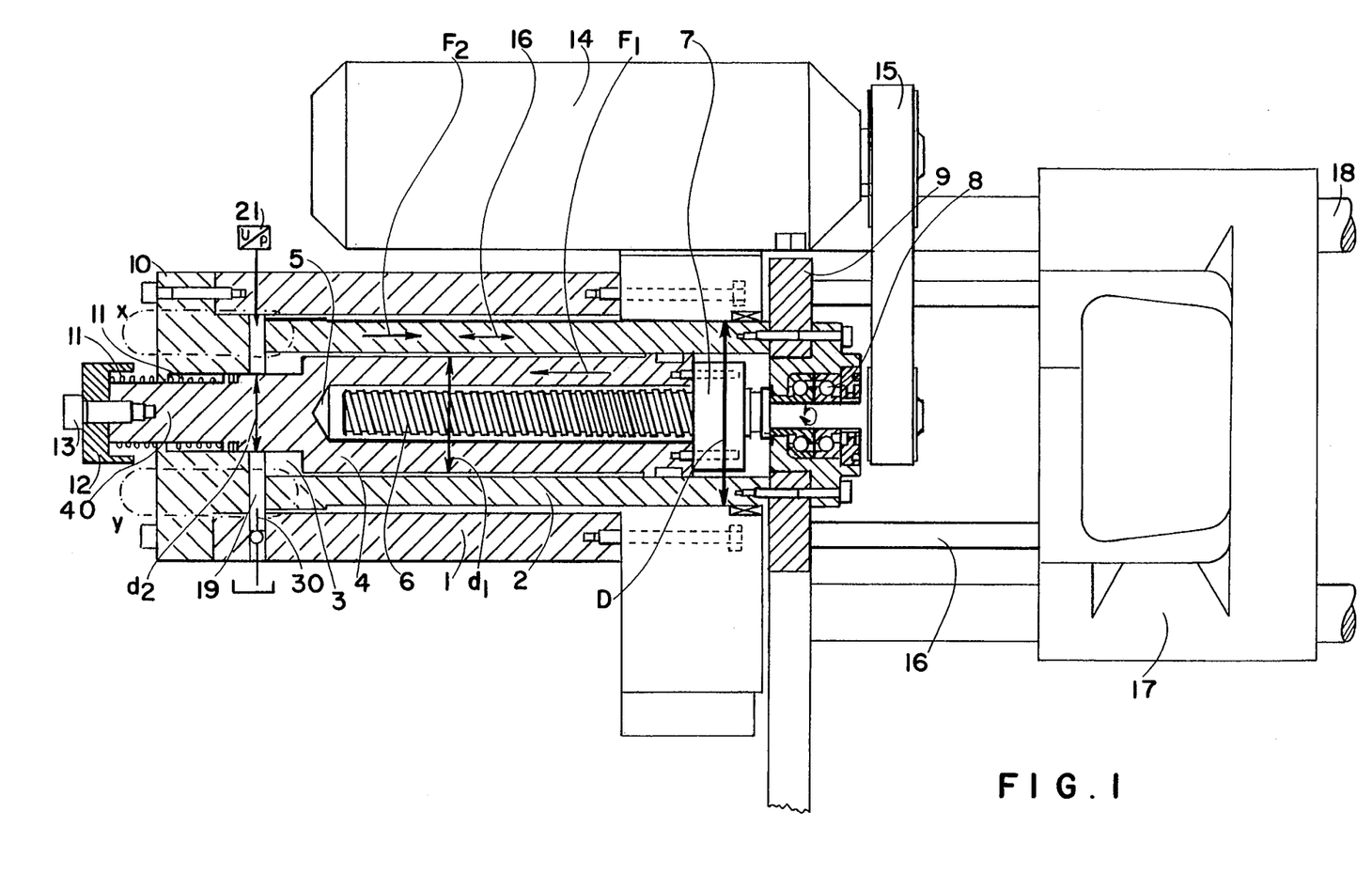
FIG. 1 depicts a schematic axial section through the arrangement according to the invention.

The essential parts of the arrangement according to the invention are a hydraulic cylinder 1 forming part of a stationary construtional unit, an hydraulic piston 2 implemented as a plunger in the cylinder 1 and having a hollow volume 3, into which projects a plunger piston 4 also disposed in the hydraulic cylinder 1. The plunger piston 4 also comprises a hollow volume into which projects a spindle 6 which is stationary in the housing. The spindle 6 is supported in a carrier plate 9 so as to be rotatable but not axially displaceable by means of a bearing 8, preferably implemented as double bearing 8. The spindle 6 projects into internal screw threads or nut 7 in the plunger piston 4. The plunger piston 4 is moved in the direction of the double arrow 16 of FIG. 1, through the rotation of spindle 6.

In the depicted embodiments, the arrangement according to the invention is used as a closure cylinder of an injection moulding machine. The carrier plate 9 is therefore connected through rods 16 to a movable form die or mould half 17. Form half 17 is guided on bars 18 in the conventional manner.

The plunger piston 4 is therein supported in the rear face plate 10 of the hydraulic cylinder 1 by means of a spring 11 or two spring assemblies 11 so that the plunger piston 4 can be moved toward the front as well as also toward the rear. The spring assemblies 11 hold the plunger piston 4 in a zero-position.

The plunger piston 4 comprises a guidance neck 40 which projects through the face plate 10 of the hydraulic cylinder 1 and is guided by the plunger piston 4.

On the plunger piston 4 is disposed a covering plate 12 held by means of a screw 13 on the plunger piston 4.

The rotation of the spindle 6 takes place by means of an electric motor 14 preferably a servomotor. In the embodiment shown, a belt drive is provided between the electric motor 14 and the spindle 6, however, other transmission means can also be used.

In the embodiment according to FIGS. 1 to 5 a lockable non-return check valve 30 and an oil pressure sensor 21 are additionally provided in the hydraulic cylinder 1. This check valve 30 can be unlockable preferably electrically or also hydraulically.

The movement of form half 17 takes place in two stages. First, before the hydraulic fluid is under sufficient pressure, purely mechanically in that the spindle 6 completes a relative movement with respect to the plunger piston 4 and, together with the carrier plate 9, moves toward the right and, secondly, after a sufficient pressure build-up, hydraulically since, when the form half 17 encounters resistance and the spindle 6 cannot move further, the plunger piston 4 is moved toward the left and the hydraulic fluid in the cylinder volume 19 is placed under pressure and the hydraulic piston 4 is thereby moved toward the right. The spindle 6 is rotated by the electric motor 14 and is supported in the carrier plate 9 so as to be non-displaceable in the axial direction. The spindle 6 furthermore engages internal screw threads 7 in the plunger piston 4.

The movement force of the hydraulic piston 2 which is equal to the closure force of the injection moulding form, is obtained as a function of P and $F_2$ where:

P is the hydraulic pressure and $F_2$ the closure force.
The piston area of the plunger piston 4 is advantageously smaller than the piston area $$\frac{(D_1^2 - d_1^2)\pi}{4}$$

of the hydraulic piston 2.

The hydraulic pressure in the hydraulic cylinder 1 can be increased through additional means.

In all the figures, the same reference numerals are used to depict the same or functionally similar parts.

Figure 6:
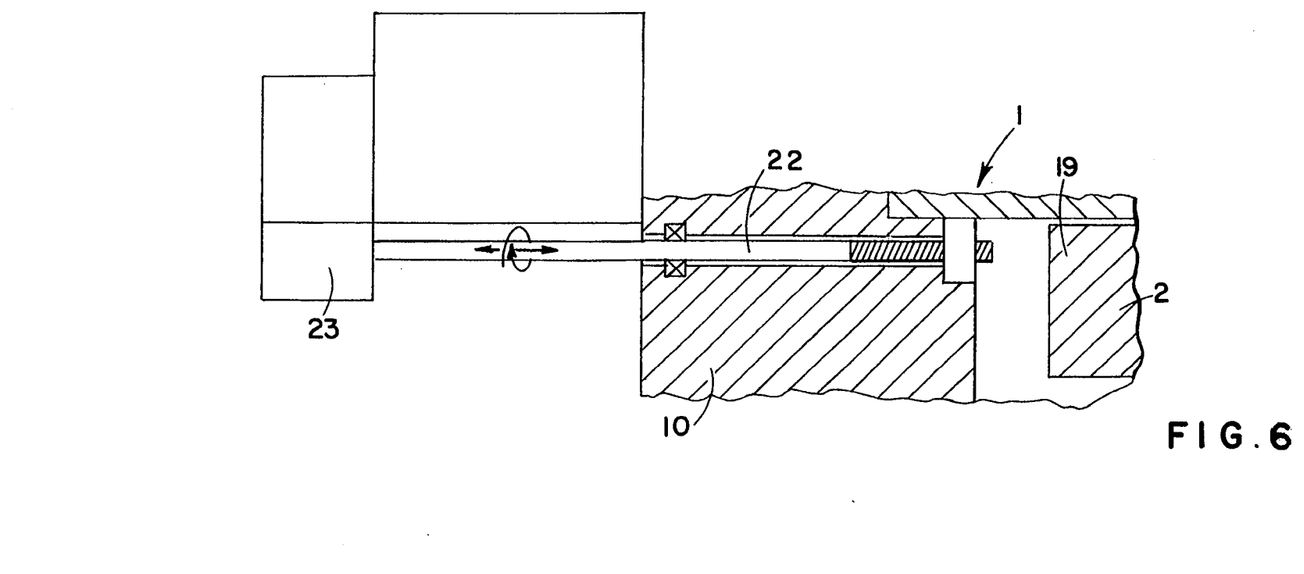
FIGS. 6 and 7 depict details X and Y of FIG. 1, i.e. examples of additional displacement bodies, in section.

FIG. 6 depicts a thread spindle 22 supported in the hydraulic cylinder 1, which can be screwed into the cylinder volume 19 by means of an electric motor 23, and displaces there the hydraulic medium and thereby increases the pressure on the hydraulic piston 2.

Figure 7:
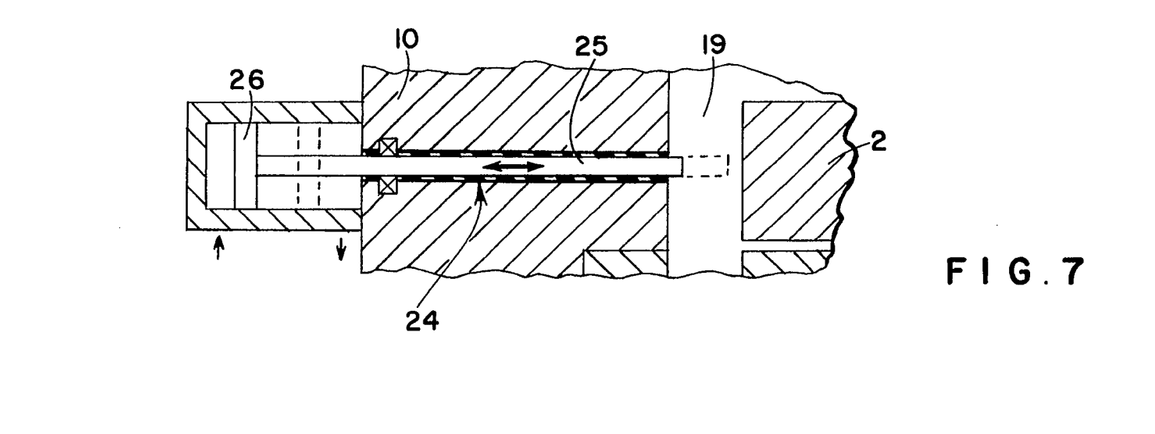

FIG. 7 depicts a hydraulic pressure intensifier 24 whose piston rod 25, like the spindle 22, projects into the cylinder volume 19 and contributes there to the compression of the medium. The hydraulic pressure intensifier 24 is moved by means of an hydraulic piston 26 and can be moved in the direction of the double arrow since the hydraulic piston 26 can be acted upon on both sides.

Figure 4:
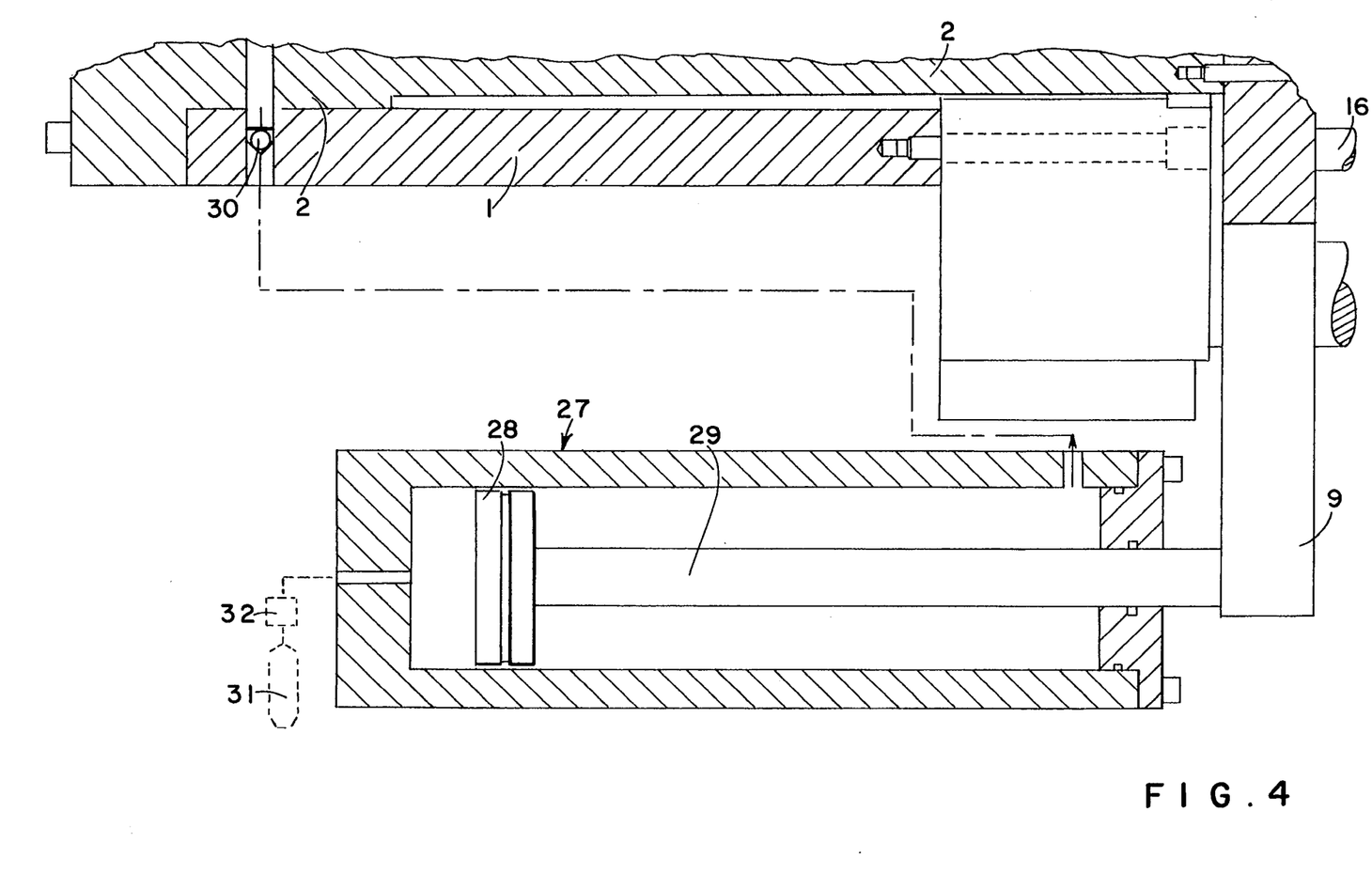
FIG. 4 depicts an axial section through an auxiliary cylinder.

In a further embodiment shown in FIG. 4, an auxiliary cylinder 27 is provided into which projects a piston 28 which is connected via a piston rod 29 with the carrier plate 9 and, consequently, with the hydraulic piston 2.

When the hydraulic piston 2 is moved toward the right, hydraulic fluid must be introduced into the cylinder volume 19 in order to compensate the piston volume.

In the embodiment, this takes place through the auxiliary cylinder 27 which is connected via a lockable valve 30 with the cylinder volume 19 of the hydraulic cylinder 1. To the auxiliary cylinder 27 can be connected a compressed gas bottle 31 with a valve unit 32 wherein the compressed gas supports the piston movement to the right.

Figure 5:
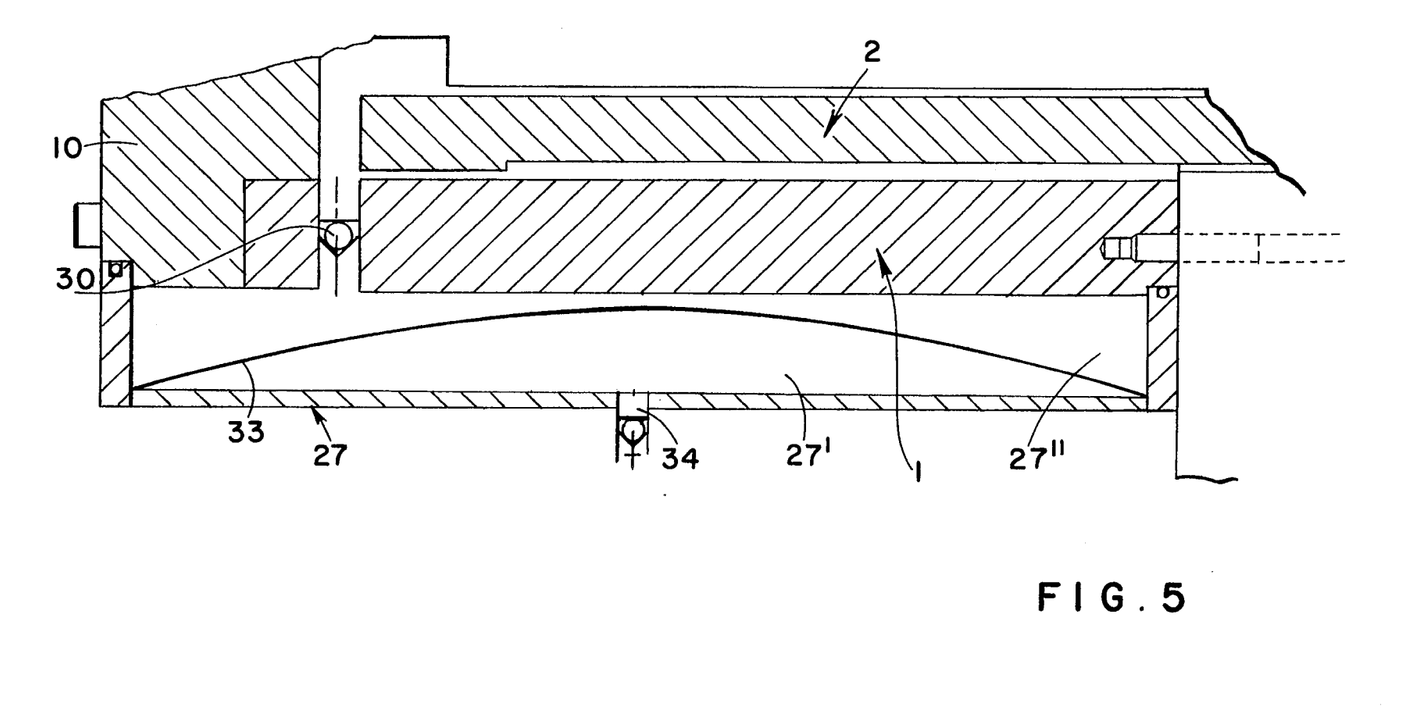
FIG. 5 depicts a section through a further embodiment of an auxiliary cylinder

In principle it would also be possible to introduce the hydraulic fluid into the hydraulic cylinder 1 by means of a differently constructed compensation vessel. FIG. 5 depicts a circular container 27 with a diaphragm 33 surrounding the hydraulic cylinder 1 and having the function of a compensation vessel. The container 27 is connected via a valve 34 to a compressed gas line. The diaphragm 33 divides the container 27 into a gas chamber 27' and an hydraulic chamber 27".

If hydraulic fluid is pressed through the piston movement from the hydraulic cylinder 1 into the container 27, the gas in the gas chamber 27' is compressed. During the next process cycle the compressed gas presses the hydraulic fluid from the container 27 into the cylinder volume 19 of the hydraulic cylinder 1.

The pressure sensor 21 functions to monitor that the pressure in the hydraulic cylinder 1 does not decrease unintentionally (leakages). The pressure sensor 21 is connected through a computer with the motor 14. As soon as the pressure in the cylinder volume 3 decreases even slightly, a correction through rotation of the motor 14 and additional rotation of the spindle 6 takes place.

Figure 10:
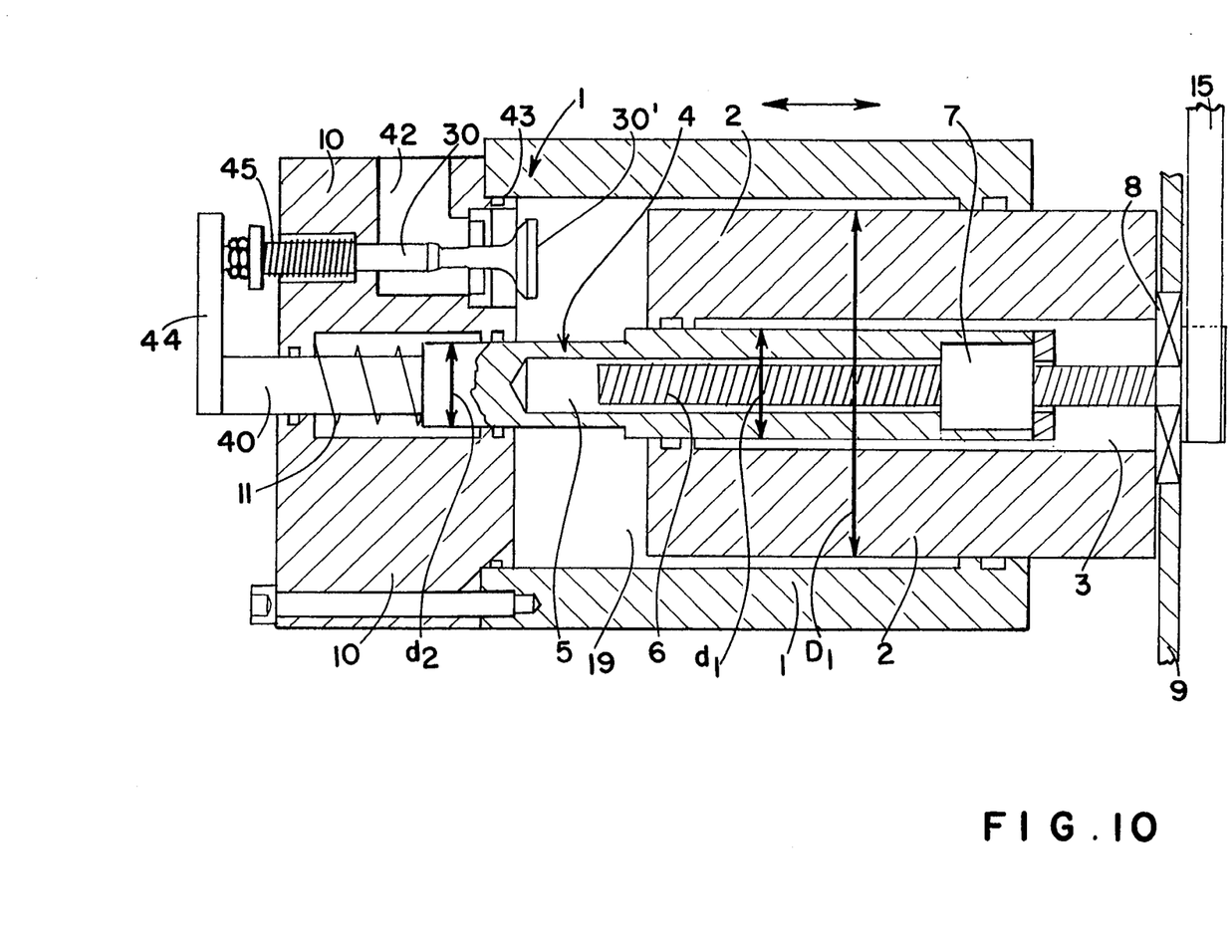
Figure 11:
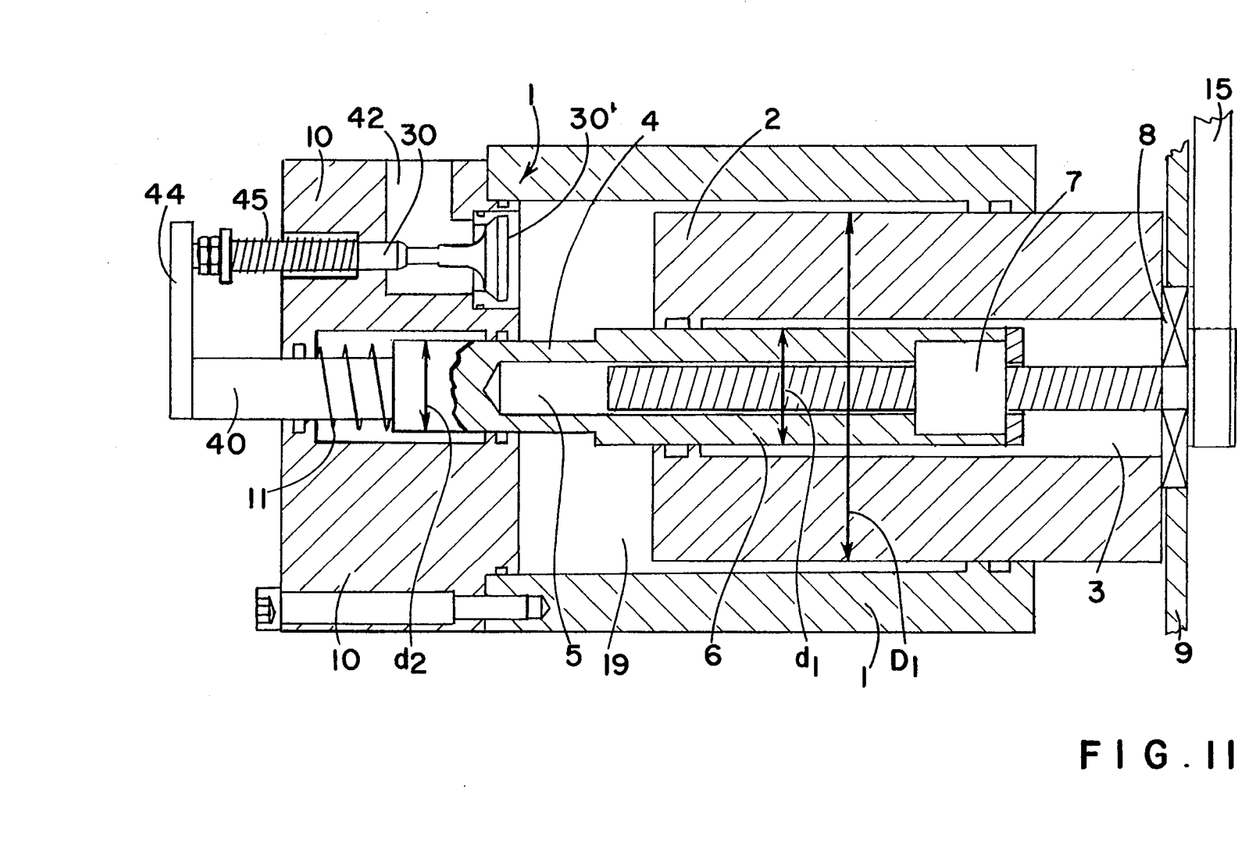
Figure 12:
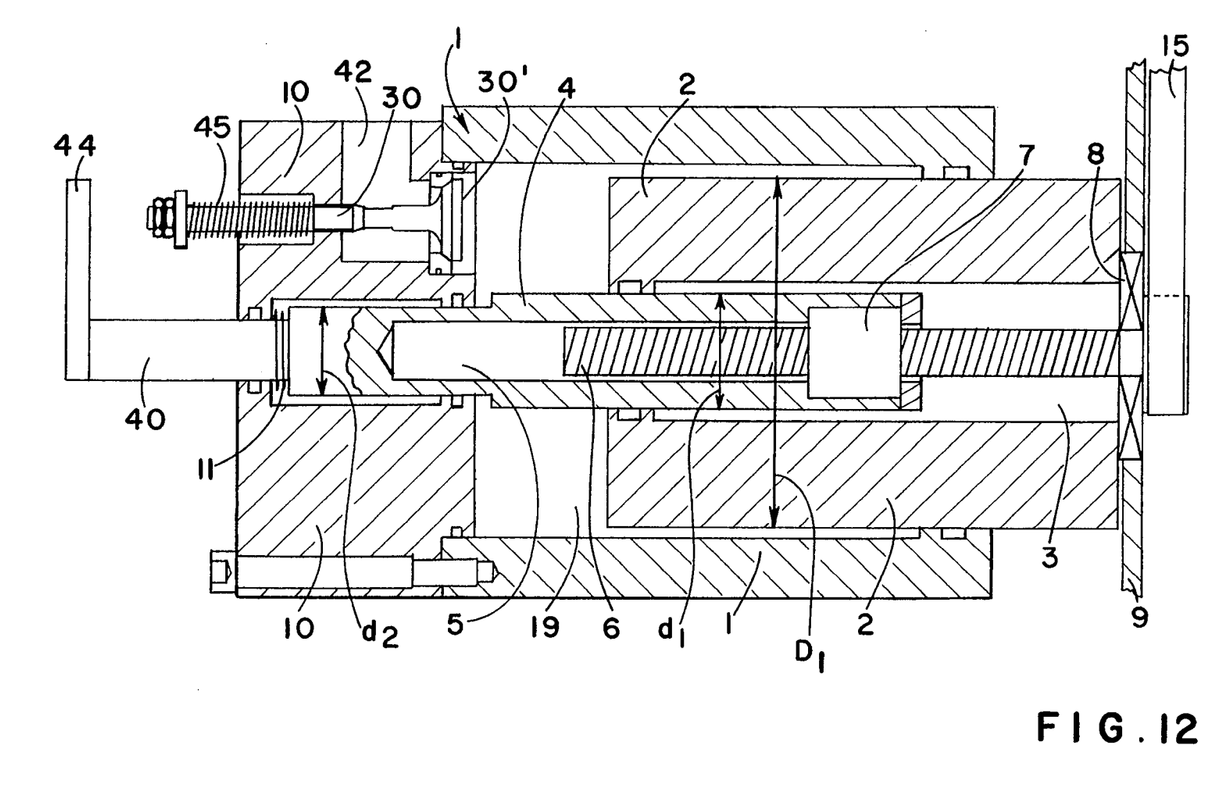

In the embodiment according to FIGS. 10 to 12 the filling valve 30 is a disk valve and is pressed into the closure position by a spring 45. The oil inflow into the into the cylinder hollow space 19 takes place via a channel 42. The valve plate 30' in the closure position seats on a bushing 43.

On the guidance neck 40 of the plunger piston 4 a stop part 44 extending from it at a right angle is formed on or fastened thereto. The movement of the hydraulic piston 2, again, takes place in two stages. First, before the hydraulic fluid is under sufficient pressure, purely mechanically in that the spindle 6 with respect to the plunger piston 4 completes a relative movement and, together with the carrier plate 9 for the electric motor 14, moves toward the right. Therein the plunger piston 4 is held in its right final position by the spring 11. The stop 44 presses on the filling valve 30 and keeps it open (FIG. 10). When the form half 17 encounters resistance and the spindle 6 cannot move further axially, the plunger piston 4 is moved to the left against the pressure of the spring 11 by the spindle 6. The section of the plunger piston 4 with the greater diameter moves out of the hydraulic piston 2 into the cylinder volume 19 and the hydraulic fluid in the cylinder volume 19 is placed under pressure. The hydraulic pressure build-up is made possible thereby that the stop 44 is removed from the filling valve 30 and the latter is closed by the spring 45 (FIG. 12). Through the hydraulic pressure build-up in the cylinder volume 19 the hydraulic piston 2 is moved at high pressure slightly to the right.

Figure 3:
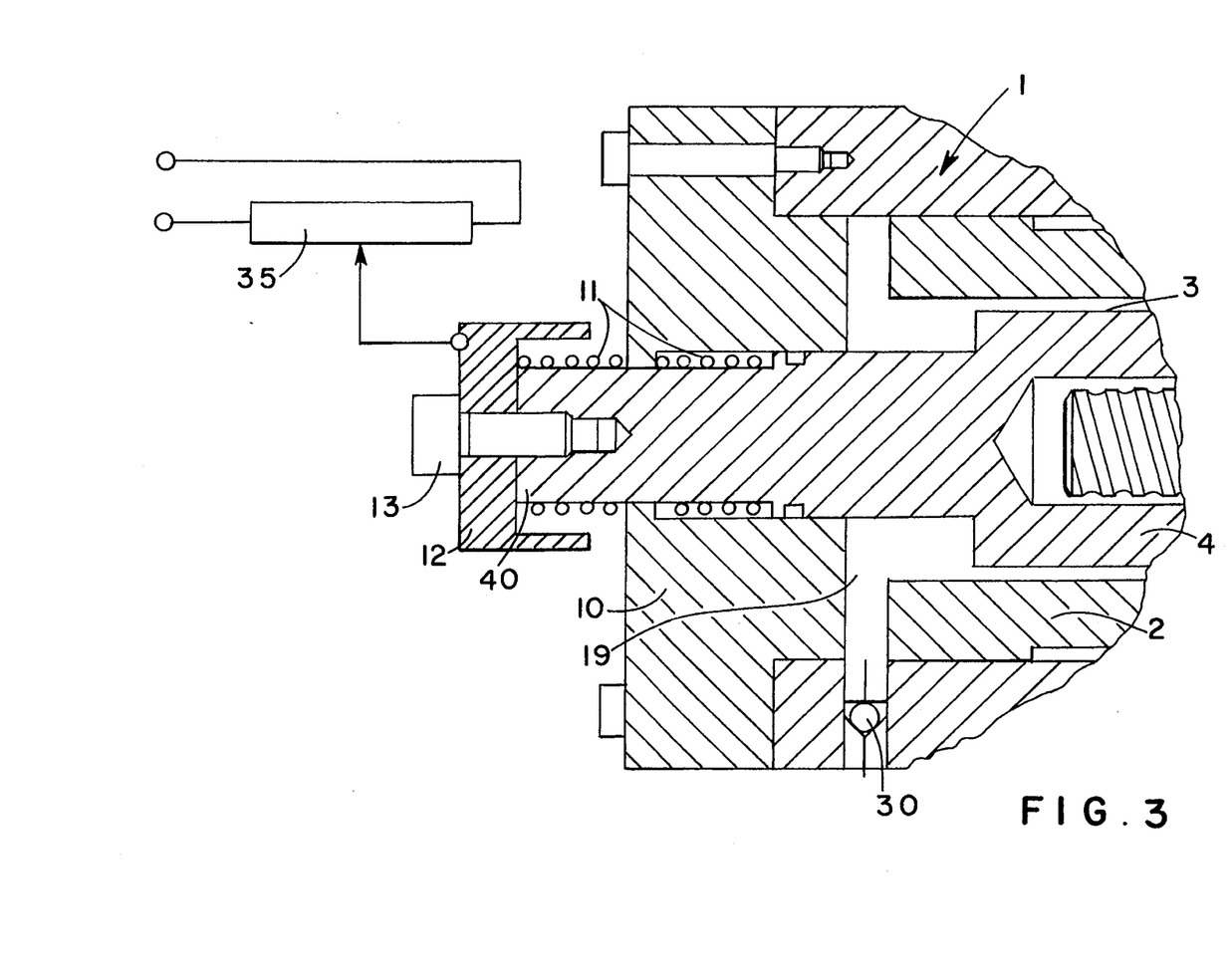
FIG. 3 depicts an axial section through the rear area of the arrangement.

As is evident in FIG. 3, the plunger piston 4 is preferably connected to a displacement transducer 35. This displacement transducer 35, which is for example an Ohm's displacement transducer, can for example serve as form or die closure securement. Upon initial operation of the arrangement a signal is output by the displacement transducer 35 to the electric motor.

Figure 8:
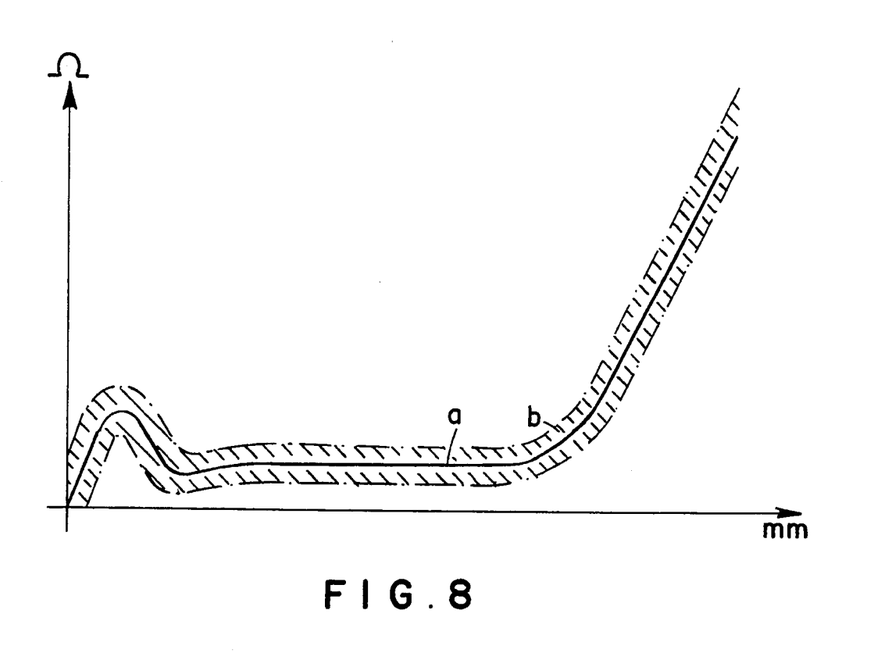
FIG. 8 is a graph of the displacement transducer signal in a standard closure process.

The operational function of the form or die protection is as follows:

Initially the form is closed in one operation process and the instantaneous value of the voltage supplied by the displacement transducer is stored according to the diagram of FIG. 8. In the diagram the ordinate indicates the particular signal of the displacement transducer and the abscissa the closure stroke. Curve a represents the instantaneous value during closure.

A band of tolerance b is defined for curve a which characterizes the form closure range.

If during the succeeding closure processes curve a remains within the tolerance band b, the closure process is completed without interference.

Figure 9:
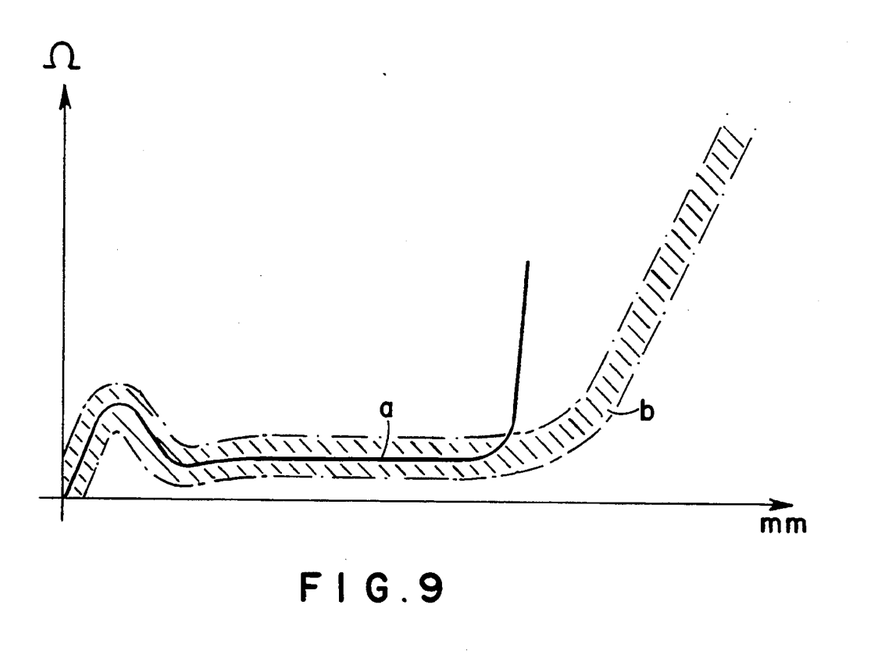
FIG. 9 is a graph of the displacement transducer signal with response for form protection, and FIGS. 10 to 12 each depict an axial section through a further embodiment of the arrangement according to the invention, in different stages of movement.

FIG. 9 depicts the same diagram as FIG. 8 upon the response of the form closure. At the instant the signals from the displacement transducer 35 according to curve a leave the form protection range b, the electric motor 14 is shut off or switched over and damage to the form is prevented.

Figure 2:
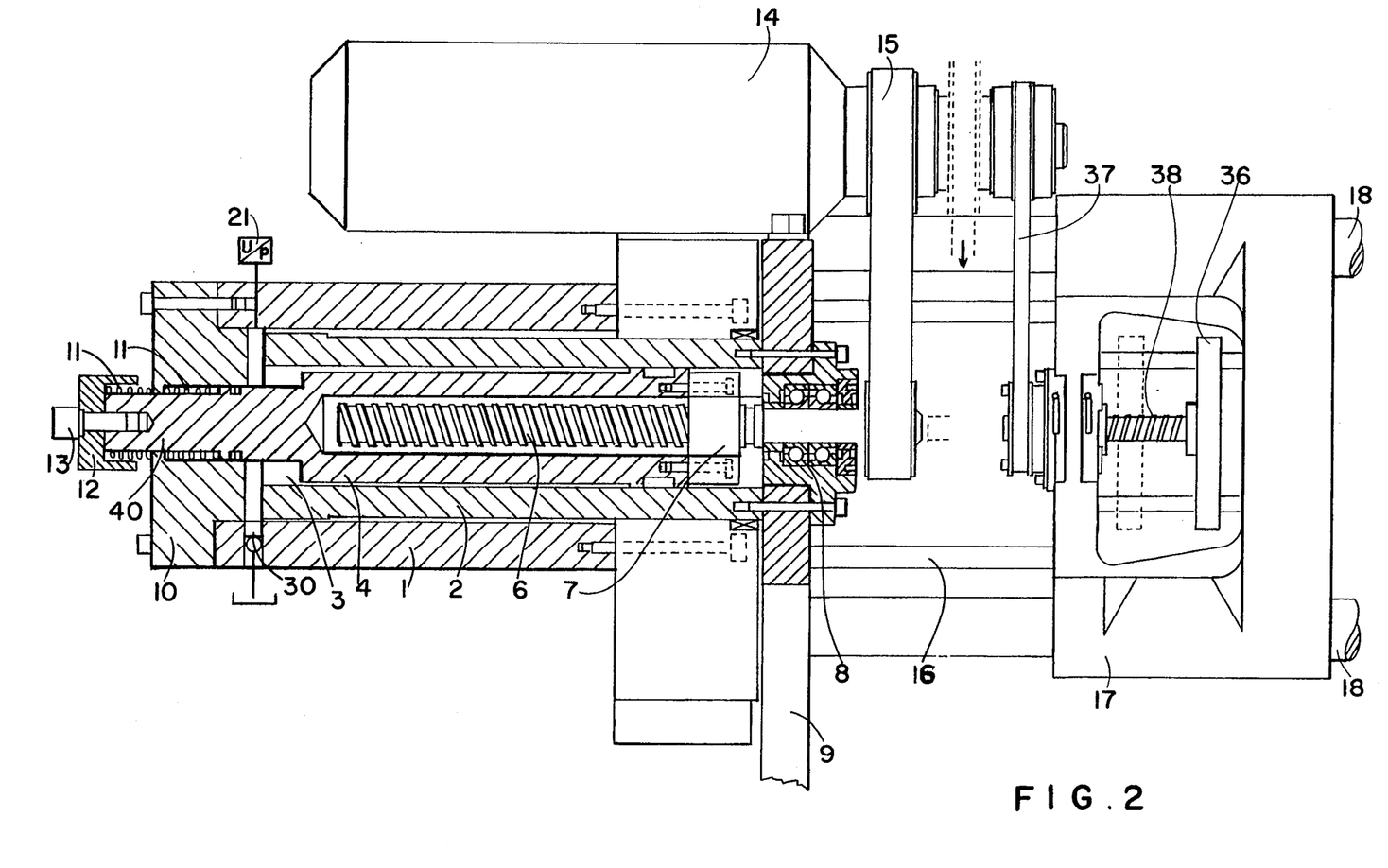
FIG. 2 depicts the same view as in FIG. 1 in a further embodiment of the invention.

As is evident in FIG. 2, the electric motor 14, apart from the rotation of the spindle 6, can also serve for actuating further additional arrangements. For example it can be coupled with a turn-out arrangment for core pullers as well as with an ejection plate 36 actuated by the electric motor 14 via a belt drive 37 and a spindle 38.

We claim:

1. An arrangement for carrying out two-stage linear movement comprising:

a stationary unit having a first hydraulic cylinder (1) with a cylinder volume (19);

pressure means operatively connected to the first hydraulic cylinder for building up pressure in the cylinder volume of the first hydraulic cylinder;

a movable unit with a second hydraulic piston (2) mounted for movement in the first hydraulic cylinder, the second hydraulic piston (2) having a hollow volume (3) therein;

a plunger piston (4) mounted for axial movement in the hollow volume of the second hydraulic piston (2) for building up pressure on the hollow volume of the second hydraulic piston;

a nut (7) non-rotatable connected to the plunger piston (4);

a spindle (6) rotatable threaded to the nut, the spindle (6) projecting into the plunger piston (4);

an electric motor operatively connected to the spindle for rotating the spindle and moving the plunger piston in the second hydraulic cylinder in order to build up pressure in the hollow volume of the second hydraulic piston.

2. An arrangement according to claim 1, including at least one spring (11) engaged with the plunger piston (4) for biasing the plunger piston (4) with respect to the second hydraulic piston.

3. An arrangement according to claim 1, wherein the first hydraulic cylinder has a face wall (10), the plunger piston (4) including a guidance neck (40) projecting through the face wall (10) for guiding movement of the plunger piston, and through the hollow space of the second hydraulic cylinder (2).

4. An arrangement according to claim 1, wherein the electric motor (14) includes a drive shaft, the arrangement including a detachable coupling connected between the spindle (6) and the driving shaft of the electric motor.

5. An arrangement according to claim 1, wherein the pressure means comprises a displacement body and means for inserting the displacement body into the cylinder volume (19) of the first hydraulic cylinder (1).

6. An arrangement according to claim 5, wherein the displacement body comprises a second spindle (22) movable into the cylinder volume.

7. An arrangement according to claim 5, wherein the displacement body comprises a ram (25) movable into the cylinder volume.

8. An arrangement according to claim 1, wherein the pressure means comprises an auxiliary container (27) having a container volume connected to the cylinder volume (19) of the first hydraulic cylinder (1), a member (27', 28) movable in the container volume for displacing hydraulic fluid into the cylinder volume, and a check valve (30) between the auxiliary container (27) and the cylinder volume (19), act to open toward the cylinder volume only.

9. An arrangement according to claim 8, wherein the auxiliary container (27) comprises an auxiliary cylinder, the member comprising an auxiliary piston (28) movable in the auxiliary cylinder and coupled to the movable unit for uniform movement with the movable unit.

10. An arrangement according to claim 8, wherein the member comprises a diaphragm (33) in the auxiliary container (27) for dividing the auxiliary container (27) into two chambers (27', 27''), one said chamber (27'') communicating with the cylinder volume of the first hydraulic cylinder (1) and the other said chamber (27') including a port (34) for inflow of compressed gas for expanding the diaphragm in the auxiliary container.

11. An arrangement according to claim 10, wherein the auxiliary container (27) encloses the first hydraulic cylinder (1) in jacket-like fashion.

12. An arrangement according to claim 8, including a displacement sensor (35) connected to the plunger piston (4) for transmitting a position signal, and computer means connected to the displacement sensor and to the electric motor and operating so that upon receiving a position signal exceeding a selected tolerance the motor is stopped.

13. An arrangement according to claim 1, wherein the plunger piston (4) and the second hydraulic piston (2) both have piston areas, the piston area of the plunger piston (4) being smaller than the piston area of the second hydraulic piston (2).

14. An arrangement according to claim 1, including a pressure sensor (21) connected to the cylinder volume (19) of the first hydraulic cylinder (1), and a computer connected to the electric motor (14) and to the sensor for controlling the motor according to the pressure sensed by the sensor.

15. An arrangement according to claim 1, including a displacement sensor (35) connected to the plunger piston (4) for transmitting a position signal, and computer means connected to the displacement sensor and to the electric motor and operating so that upon receiving a position signal exceeding a selected tolerance the motor is stopped.

* * * * *